United States Patent [19]

Kakizaki et al.

[11] Patent Number: 4,972,109
[45] Date of Patent: Nov. 20, 1990

[54] STEPPING MOTOR

[75] Inventors: Masaaki Kakizaki, Kawasaki; Akira Torisawa, Tokyo; Noriaki Ito, Yokohama, all of Japan

[73] Assignee: Canon Kabushiki Kaisha, Tokyo, Japan

[21] Appl. No.: 281,393

[22] Filed: Dec. 8, 1988

[30] Foreign Application Priority Data

Dec. 15, 1987 [JP] Japan .................. 62-190841[U]

[51] Int. Cl.⁵ ............................. H02K 37/00
[52] U.S. Cl. .................. 310/49 A; 310/49 R
[58] Field of Search ........... 310/42, 49 A, 49 R, 310/112, 254, 257

[56] References Cited

U.S. PATENT DOCUMENTS

| 4,330,724 | 5/1982 | Goddijn | 310/49 |
| 4,672,247 | 6/1987 | Madsen et al. | 310/49 |
| 4,794,292 | 12/1988 | Torisawa | 310/257 |

FOREIGN PATENT DOCUMENTS

| 3321254 | 12/1984 | Fed. Rep. of Germany . |
| 59-53079 | 3/1984 | Japan . |
| 1067334 | 5/1967 | United Kingdom . |
| 2030789 | 8/1979 | United Kingdom . |
| 2095917 | 10/1982 | United Kingdom . |
| 2192313 | 1/1988 | United Kingdom . |

Primary Examiner—William H. Beha, Jr.
Assistant Examiner—Judson H. Jones
Attorney, Agent, or Firm—Fitzpatrick, Cella, Harper & Scinto

[57] ABSTRACT

A stepping motor comprising a rotor having magnetic poles on the peripheral surface thereof at a predetermined pitch, first and second stator yoke units each having pole teeth at the predetermined pitch and disposed with deviation of ¼ pitch therebetween relative to the rotor, and a coil for exciting the first and second stator yoke units, characterized by means for adjusting the phase deviation between the first and second stator yoke units.

2 Claims, 18 Drawing Sheets

FIG.18

| DEVIATION OF MECHANICAL ANGLE θk | COGGING TORQUE |
|---|---|
| 0 | 0 |
| 0.1 | 0.042 TK |
| 0.2 | 0.084 TK |
| 0.3 | 0.126 TK |
| 0.4 | 0.167 TK |
| 0.5 | 0.209 TK |
| 0.6 | 0.251 TK |
| 0.7 | 0.292 TK |
| 0.8 | 0.334 TK |
| 0.9 | 0.375 TK |
| 1.0 | 0.416 TK |
| 1.5 | 0.618 TK |
| 2.0 | 0.813 TK |

STEPPING MOTOR

BACKGROUND OF THE INVENTION

1. Field of the Invention

This invention relates to a stepping motor having two sets of stator yoke units, and in particular to the adjustment of cogging torque.

2. Related Background Art

Referring to FIG. 10 of the accompanying drawings which shows the structure of stator yoke units used in a stepping motor according to the prior art, stators 1 and 2 having stator poles 1a and 2a, respectively, constructed in the form of comb teeth form a stator yoke unit. Stator yoke units constructed of entirely the same stators as the pair of stators and 2 are disposed back to back on their respective stators 2 and constitute the stator assembly of the stepping motor. The two sets of stator yoke units are such that circular bosses 2b and holes 2c are formed in each of the respective stators 2 so that the phases of the stator poles deviate from each other by ¼ pitch.

Referring now to FIG. 11 of the accompanying drawings which is a perspective view of the stepping motor constructed in the manner described above, the reference numeral 12 designates a rotor shaft, and a cylindrical rotor magnet 13 is fixed coaxially with the rotor shaft 12 for rotation about the rotor shaft. The rotor magnet 13 has formed on the peripheral surface thereof opposed to the stator poles 1a, 2a, 1a, 2a the same number of magnetic poles as the number of the stator poles on one set of stator yoke units. That is, the number of one set of stator poles in FIG. 11 is 24, and in this case, the number of the magnetic poles of the rotor is 24 because each of N poles and S poles is counted as one, and is 12 if counted in terms of the number of pairs of magnetic poles. The reference numerals 14 and 15 denote coils wound on the respective stator yoke units in the form of bifilar turns and led out of the stators through cut-away portions 1f, 1f, 2f and 2f.

FIG. 12 of the accompanying drawings is a diagram of the driving circuit of the stepping motor, and FIG. 13 of the accompanying drawings is a time chart of 2-phase excitation driving pulses applied to the driving circuit of FIG. 12.

FIG. 14a of the accompanying drawings is a developed view of stator poles and a rotor magnet of the stepping motor of FIG. 11. Two sets of stator yoke units are designated by a (comprising stators $1a_1$ and $2a_1$) and b (comprising stators $1a_2$ and $2a_2$), respectively, and the magnetic poles of the rotor are denoted by 13a.

Here, description will be made of the stationary position of the rotor and the cogging torque when the coils are not excited.

Description will first be made of the cogging torque acting between the stator yoke unit a and the rotor.

In considering the torque acting between the stator yoke unit a comprising one set of stators and the rotor, a two-pole stepping motor shown in FIG. 15 of the accompanying drawings is adopted as a model. This two-pole stepping motor corresponds to one pitch of the stepping motor of FIG. 11.

If in FIG. 15, the coordinates x, y are defined as shown, the point at which the torque acting on the rotor 16 is zero is the point at which the center of the magnetic pole coincides with the center of the stator pole and therefore, $\theta = 0, \pi, 2\pi, \ldots, n\pi$.

Also, when $$\theta = \frac{\pi}{2}, \frac{3\pi}{2}, \ldots, \frac{2n-1}{2}\pi,$$

the torque acts equally on the rotor 16 between the right and left stators 17 and 18 and therefore, again in this case, the torque is zero. Assuming that the torque varies in the fashion of sine, $$Ta = a_1 \sin 2\theta \qquad (1)$$

and the torque varies at a period of ½ of the period $2\pi$ of the stator poles.

If the number of the pairs of magnetic poles of the stator and the rotor is p, the equation (1) becomes $$Ta = a_1 \sin 2p\theta. \qquad (2)$$

If $p\theta = \alpha$, $$Ta = a_1 \sin 2\alpha. \qquad (3)$$

The equation (2) is a case represented by mechanical angle, and the equation (3) is a case represented by electrical angle. Description will hereinafter be made by the use of $\alpha$.

A curve Ta in FIG. 16 of the accompanying drawings represents the cogging torque acting between the stator yoke unit a and the rotor. On the other hand, the torque acting between the stator yoke unit b and the rotor is represented as $$Tb = b_1 \sin 2p\left(\theta + \frac{1}{4} \cdot \frac{2\pi}{p}\right) = b_1 \sin 2p\left(\theta + \frac{\pi}{2p}\right) \qquad (4)$$

because the stator yoke unit b deviates in phase by ¼ pitch relative to the stator yoke unit a. On the other hand, in terms of electrical angle, $$Tb = b_1 \sin 2\left(\alpha + \frac{\pi}{2}\right) = -b_1 \sin 2\alpha. \qquad (5)$$

That is, in contrast with Ta, the sign has only changed. The curve Tb of FIG. 17 of the accompanying drawings represents the above equation with p as p = 1.

Here, the cogging torque To as the stepping motor can be represented by the sum of cogging torques acting on the two stator yoke units a and b and the rotor and therefore is $$\begin{aligned} To &= Ta + Tb \\ &= (a_1 - b_1) \sin 2\alpha. \end{aligned}$$

The curve To of FIG. 16 shows the characteristic of the cogging torque when $a_1 > b_1$, and the cogging torque To of the stepping motor does not differ from the cogging torque acting between a single stator yoke unit and the rotor, in the number and positions of the points at which the torque is zero, and the peak value thereof only becomes small. If $a_1 = b_1$, the cogging torque becomes zero. Also, if $a_1$ and $b_1$ can be controlled arbitrarily, the magnitude of the cogging torque can be set to any magnitude.

Consider now a case where deviation exists in the circumferential direction with respect to the rotor shaft 12, that is, a case where the stator yoke unit a and the stator yoke unit b are disposed with phase deviation of ¼ pitch and the stator yoke unit b deviates from this position by an angle error αk (electrical angle).

Assuming that the position of the rotor when the point at which the center of the magnetic pole of the rotor and the center of the magnetic pole of the stator yoke unit coincide with each other is regarded as the reference angle θ (mechanical angle), and assuming that the magnitude of the torque produced in the stator yoke unit a is Tk and the magnitude of the torque produced in the stator yoke unit b is Tk+ΔT, the cogging torque T1 acting on the two stator yoke units a and b and the rotor is represented as $$T1 = Tk\sin 2p\theta + (Tk + \Delta T)\sin 2\left(p\theta + \frac{\pi}{2} + \alpha k\right)$$

and therefore, if it is resolved and put in order, the following is obtained:

$$T1 = -\sqrt{(2Tk\sin\alpha k\cos\alpha k)^2 + (2Tk\sin\alpha k + \Delta T)^2} \cdot \sin(2p\theta + 2\alpha k + \gamma)$$

$$\gamma = \tan^{-1}\frac{2Tk\sin\alpha k\cos\alpha k}{2Tk\sin\alpha k + \Delta T}$$

But high-order components are not taken into consideration.

Usually, the cogging torque refers to the maximum value of the above equation and therefore, $T1\text{Max} = -\sqrt{(2Tk\sin\alpha k\cos\alpha k)^2 + (2Tk\sin\alpha k + \Delta T)^2}$ is the cogging torque. Accordingly, the cogging torque has its magnitude determined by the angle error αk and the non-uniformity of the magnitude of the cogging torque between the stator yoke units.

Here, assuming that ΔT =0 and examining the influence of only the angle error αk upon the production of the cogging torque, the maximum value of the cogging torque is T1Max=2Tksinαk and the influence is as shown in the table of FIG. 18 of the accompanying drawings In calculation, one period of the electrical angle has been calculated with respect to a mechanical angle of 30°, i.e., a case where the stator has twelve poles, and assuming that the deviation of the mechanical angle is θk, 2k =12θk. From this result, it is seen that if the two sets of stator yoke units are in a right position, no cogging will occur, but is the stator yoke units deviate by 0.5°, there will occur cogging corresponding to 20% of the magnitude of the cogging torque produced by one set of stators.

Description will now be made of the relation between the stationary position of the rotor and the position in which the cogging torque To is zero.

Generally, between the magnetic energy W by the rotor magnet of a stepping motor and the cogging torque, there is the following relation:

$$T_o(\alpha) = \frac{W}{\alpha}$$

Thus, the magnetic energy W can be represented by $$W = T_o(\alpha)d\alpha + W_o \quad (5)$$
$$= (a_1 - b_1)\sin 2\alpha \cdot d\alpha + W_o$$
$$(a_1 > b_1)$$
$$= -\frac{a_1 - b_1}{2}\cos 2\alpha + W_o.$$

FIG. 17 shows the relation between the magnetic energy of the above equation and the rotor position. Here, the rotor 13 tries to come to a standstill at a location whereat the magnetic energy is smallest and therefore, in the position of α=π/2, 3π/2 . . . . (2n−1)π/2, the cogging torque becomes zero and thus, originally, the rotor tries to come to a standstill in this position, but since the magnetic energy W is high, the rotor becomes unstable and does not come to a standstill (the time when the rotor stably comes to a standstill is the time when frictional force is great). After all, it is in the position of α=0, π, 2π, . . . , nπ that the rotor stably comes to a standstill.

That is, the rotor stably comes to a standstill in a position in which the cogging torque curve changes from the negative to the positive, and the rotor does not stably come to a standstill in a position in which the cogging torque changes from the positive to the negative.

As is apparent from the foregoing description, the stationary position of the rotor of the stepping motor in a state in which the coil is not excited is α=0, π, 2π, . . ., nπ (n being an integer).

The operation when the rotor rotates by an amount corresponding to one pitch of the stator poles when the coils of the stepping motor shown in FIG. 12 are excited as shown in FIG. 13 will now be described with reference to the developed view of FIG. 14a showing the stator poles and rotor magnetic poles of the stepping motor.

As already described, when the coils are not excited, the rotor 13 is in the position of α=0. When the phase A and phase B are subsequently excited, the magnetic poles 13a come to the position of ⅛ pitch intermediate of the stator poles 1a, 1a, i.e., the position of α=π/4. In the next phase B and phase $\overline{A}$, the magnetic poles come to the position of 3/8 pitch intermediate of ¼ pitch and ½ pitch (α=3π/4). In the next phase $\overline{A}$ and phase $\overline{B}$, the magnetic poles come to the position of ⅝ pitch intermediate of ½ pitch and ¾ pitch (α=5π/4). In the next phase $\overline{B}$ and phase A, the magnetic poles come to the position of ⅞ pitch intermediate of ¾ pitch and 1 pitch (α=7π/4). Subsequently, in the phase A and phase B, the same thing as the beginning is repeated.

In a stepping motor wherein two yoke members each provided with a plurality of pole teeth parallel to a rotor shaft on the inner surface thereof are combined into one pair and which has two pairs of yokes, welding and fixing each pair of yokes when assembling the yokes is described and shown in Japanese Laid-Open Patent Application No. 59-53079.

The stationary angle error of the rotor in the excited condition of the coils of the stepping motor will now be described with reference to FIG. 14b. In this figure, the solid line shows the cogging torque To =(a₁−b₁) sin 2α, and the plus side which is the upper half of the torque of the vertical axis is a torque for returning the rotor with respect to the direction of movement of the rotor, and the minus side which is the lower half is a torque for advancing the rotor.

In the non-excited condition, the rotor is stationary in the position of $\alpha=0$.

Now, since the first step of excitation excites the phases A and B, the exciting torque of dotted line 19 acts and tries to advance the rotor 13 to the position of $\alpha=\pi/4$ in which the exciting torque is zero. On the other hand, in the position of $\alpha=\pi/4$, a cogging torque which is $a_1-b_1$ is acting. This cogging torque acts in a direction to return the rotor to the position of $\alpha=0$ and therefore, after all, the rotor comes to a standstill in a position wherein the torque which returns the rotor by the cogging torque and the torque which advances the rotor by the torque exciting the phases A and B are balanced with each other. This position is the position of $\alpha=\alpha 1$ in FIG. 14b, and is on this side of the position of $\alpha=\pi/4$ which is the stationary position of the rotor which should originally be obtained. At the second step, the phases $\overline{A}$ and B are excited, and the exciting torque of dotted line 20 acts and tries to advance the rotor to the position of $\alpha=3\pi/4$ in which the exciting torque is zero.

On the other hand, in the position of $\alpha=3\pi/4$, a cogging torque which is $-(a_1-b_1)$ acts. This cogging torque acts in a direction to advance the rotor and therefore, after all, the rotor comes to a standstill in a position wherein the torque which advances the rotor by the cogging torque and the torque which returns the rotor by the torque exciting the phases A and B are balanced with each other. This position is the position of $\alpha=\alpha 2$ in FIG. 14b, and is advanced with respect to the position of $\alpha=3\pi/4$ which is the stationary position of the rotor which should originally be obtained.

At the next third steps, the same thing as the first step happens and the rotor comes to a standstill in a position $\alpha 3$ which is on this side of the position of $\alpha=5\pi/4$ which is the original stationary position of the rotor. Further, at the fourth step, the same thing as the second step happens and the rotor comes to a standstill in a position $\alpha 4$ advanced with respect to the position of $\alpha=7\pi/4$ which is the original stationary position of the rotor. If the angle error of the rotor relative to the position which should originally be obtained is plotted on the vertical axis and the number of steps of the stepping motor is plotted on the horizontal axis, there is obtained the characteristic of FIG. 14c of the accompanying drawings. In the case of the two-phase excitation system, usually the angle error of the rotor has its sign reversed at each step. That is, the amount of angular movement of the rotor changes to small, great and small at each step, and this has led to the important disadvantage that a uniform accurate amount of movement is not obtained.

Also, in the rotating condition of the motor, the fluctuation of the cogging torque can be regarded as the fluctuation of an extraneous load applied to the motor, and this has also led to the disadvantage that when an attempt is made to utilize the stepping motor as a multi-pole brushless DC motor, it is difficult to drive the motor smoothly so that there occurs no fluctuation of the number of rotations, by speed control in a state in which these load fluctuations corresponding to one half of the number of excitation change-overs exist during one full rotation.

As regards a motor of small cogging torque, there has been the disadvantage that where the motor is used for positioning or the like, when the driving current of the motor is cut off, the retained torque is small and therefore the set position is liable to deviate due to external factors.

SUMMARY OF THE INVENTION

A first task of the present invention is to provide a stepping motor having means for eliminating the disadvantage peculiar to the prior art that the amount of angular movement of a rotor fluctuates.

A further task of the present invention is to provide a stepping motor having cogging torque adjusting means.

Still a further task of the present invention is to provide a stepping motor of a construction in which the two sets of stator yoke units shown in FIGS. 10 to 18 are combined together and in which cogging torque can be adjusted by adjusting the relative position of a first stator yoke unit and a second stator yoke unit about the axis of the rotor shaft.

BRIEF DESCRIPTION OF THE DRAWINGS

FIG. 16 illustrates the relation between the cogging torque and the angle $\alpha$ in a stator set a.

FIG. 18 shows the relation between the deviation $\theta k$ of mechanical angle and cogging torque.

DESCRIPTION OF THE PREFERRED EMBODIMENTS

Figure 1A:
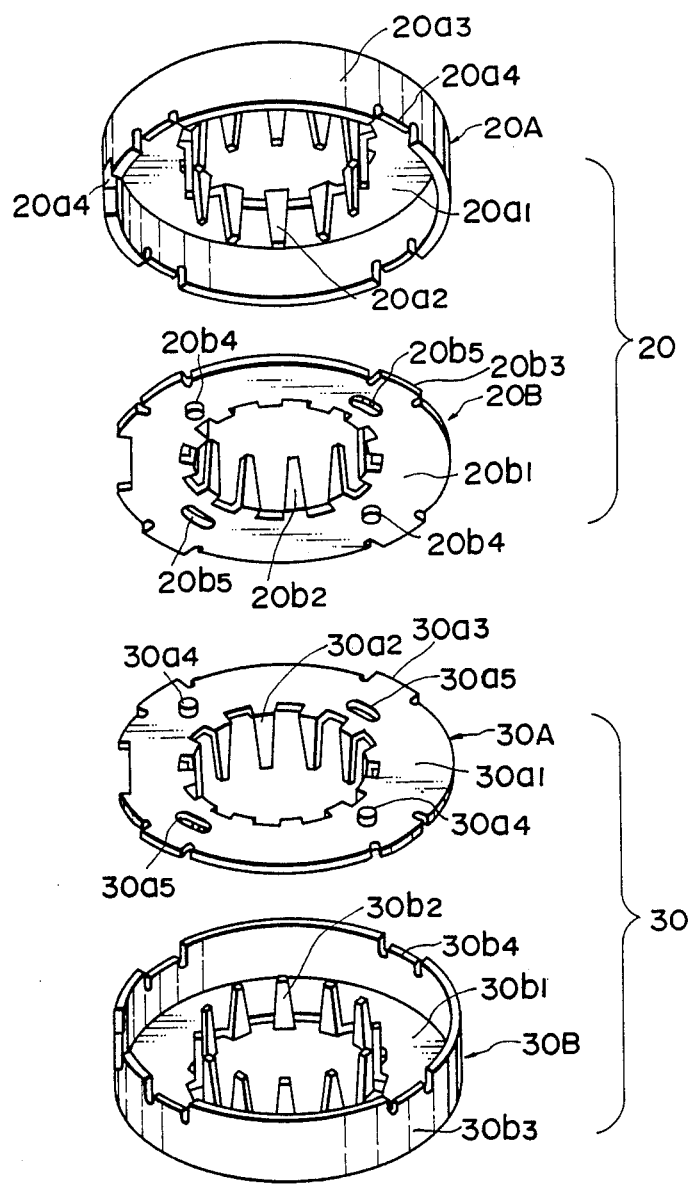
FIG. 1a is an exploded perspective view of a stator set according to a first embodiment of the present invention.
Figure 1B:
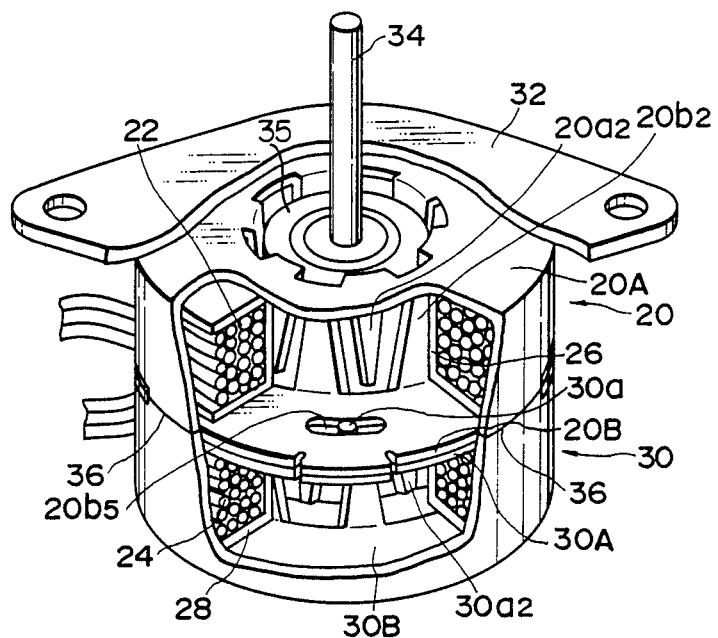
FIG. 1b is a partly broken-away perspective view of a stepping motor according to the first embodiment of the present invention.

FIGS. 1a and 1b show a first embodiment of the present invention. In these figures, the reference numeral 20 designates a first stator yoke unit and the reference numeral 30 denotes a second stator yoke unit. FIG. 1a shows an exploded view of the stator yoke units, and FIG. 1b shows a partly broken-away view of an assembled motor.

The first stator yoke unit 20 comprises a cylindrical first stator member 20A and a ring plate-shaped second stator member 20B.

The first stator member 20A comprises a ring plate portion $20a_1$, a plurality of first pole teeth $20a_2$ provided in the same direction as the axis of a rotor shaft to be described from the inner periphery of the ring plate portion and about the axis, a first cylinder portion $20a_3$ extending from the outer periphery of said ring plate portion, and cut-away portions $20a_4$ formed in the end surface of said first cylinder portion. The second stator member 20B comprises a ring plate portion $20b_1$, a plurality of second pole teeth $20b_2$ extending from the inner periphery of said ring plate portion, and projected portions $20b_3$ protruding from the outer periphery of said ring plate portion and engaged with said cut-away portions $20a_4$.

The first pole teeth $20a_2$ of the first stator member and the second pole teeth $20b_2$ of the second stator member are constructed in a relation as shown in FIG. 1b wherein the phases thereof deviate by $\frac{1}{2}$ pitch from one another. The second stator member 20B and the first stator member 20A are combined together with the projected portions $20b_3$ engaged with the cut-away portions $20a_4$, whereby the first stator 20A and the second stator 20B are constituted by suitable fixing means, for example, welding means.

The second stator yoke unit 30 has a third stator member 30A and a fourth stator member 30B, and the third stator member 30A is of the same shape as the second stator member and comprises a ring plate portion $30a_1$, third pole teeth $30a_2$ and projected portions $30a_3$.

The fourth stator member 30B is of the same shape as the first stator member 20A, and has a ring plate portion $30a_1$, fourth pole teeth $30a_2$, a cylinder portion $30a_3$ and cut-away portions $30a_4$ formed in the end surface of said cylinder portion.

The third stator member 30A and the fourth stator member 30B are fixed to each other by the aforementioned welding means with the projected portions $30a_3$ engaged with the cut-away portions $30a_4$ and with the third pole teeth $30a_2$ and the fourth pole teeth $30b_2$ being kept in a positional relation in which they deviate from one another by $\frac{1}{2}$ pitch.

The reference numerals 22 and 24 in FIG. 1b designate coils. The coils 22 and 24 are contained in coil bobbins 26 and 28, respectively, fitted to the inner sides of said cylinder portions $20a$ and $30a_3$ of said first and fourth stator members 20A and 30B and are connected to a conventional motor driving circuit, and excite said pole teeth by electrical energization.

The reference numeral 32 denotes a motor mounting plate.

Figure 14A:
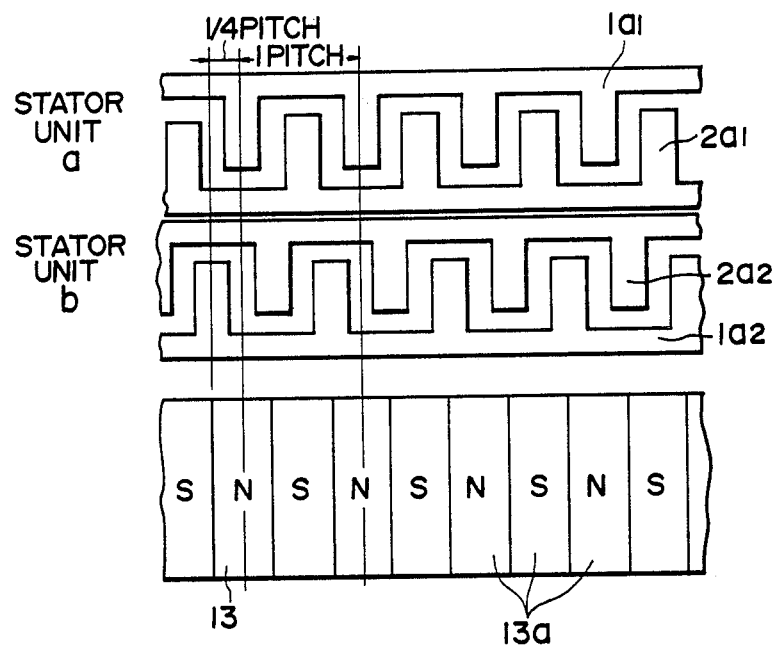
FIG. 14a is a developed view about the magnetic poles of the stepping motor.
Figure 14B:
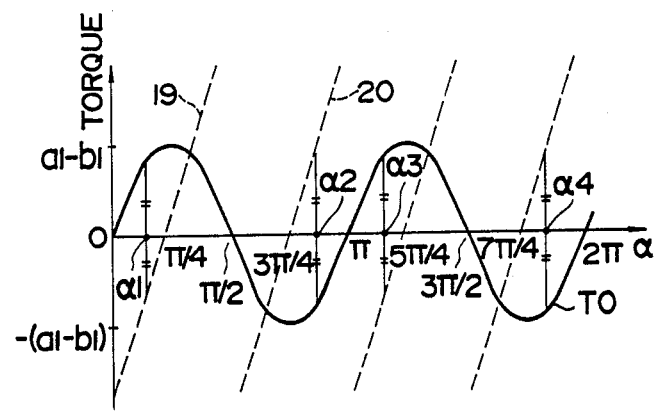
FIG. 14b illustrates the stationary position of a rotor.

The reference numeral 34 designates the shaft of a motor, and the reference numeral 35 denotes a magnet fixed to said shaft. The magnet 35 has a plurality of N and S poles magnetized on the outer periphery thereof as shown in FIG. 14a.

A rotor comprising said shaft 34 and said magnet 36 is inserted in the central openings in the first and second stator yoke units, and the shaft 34 is supported by a bearing, not shown, which is mounted on the motor mounting plate 32.

Adjusting means for the first embodiment will now be described.

Turning back to FIG. 1a, projected portions $20b_4$ and $30a_4$ and arcuate slots $20b_5$ and $30a_5$ concentric with said axis and fitted over said projected portions are formed in the mutually opposed ring plate portions of the second stator member 20B and the third stator member 30A. Said projected portions and said slots together constitute means for adjusting the positions of the first stator yoke unit 20 and the second stator yoke unit 30.

The adjusting method by the aforedescribed adjusting means will now be described.

As shown in FIG. 1b, the rotor is inserted into the inside of the first stator yoke unit 20 and the second stator yoke unit 30, and the first stator yoke unit 20 is fixed to the motor mounting plate 32. Before adjustment, the first stator yoke unit 20 and the second stator yoke unit 30 are capable of fluctuating about the axis within the range of movement of the projected portions formed on the second and third stator members in said slots, and cogging torque is measured with the two stator yoke units tentatively fixed at any locations. For the measurement of cogging torque, a motor to be measured is connected to a measuring drive motor, one end of a tape is twined on the shaft 34 of the motor to be measured and the other end of the tape is connected to a conventional tension analyzer, and a tension sensor is provided on the intermediate portion of the tape. By electrical energization of the measuring drive motor, the shaft 34 starts to take up the tape. As the tape is taken up by the shaft, the tension of the tape incites the tension sensor to displacement, and an electrical signal is supplied from the tension sensor to the tension analyzer.

Cogging torque per rotation of the shaft 34 of the motor to be measured is output as an electrical signal from the tension analyzer, and this signal can be printed out by a printer.

When the tentative fixing of the first stator yoke unit and the second stator yoke unit is released and the stator yoke units are fluctuated relative to each other, a variation in the cogging torque can be confirmed. When the cogging torque is to be adjusted to a small value, the stator yoke units are rotated so that the phase of the second and third stator members is $\frac{1}{4}$ pitch. Also, to obtain cogging torque of any magnitude, the stator yoke units can be rotated in the vicinity of $\frac{1}{4}$ pitch.

After the adjustment of the positions of the first stator yoke unit and the second stator yoke unit, the abutting surfaces 36 of the cylinder portions $20a_3$ and $30b_3$ of the first stator member 20A and the fourth stator member 30B which are shown in FIG. 1b are welded at a plurality of locations.

Figure 2:
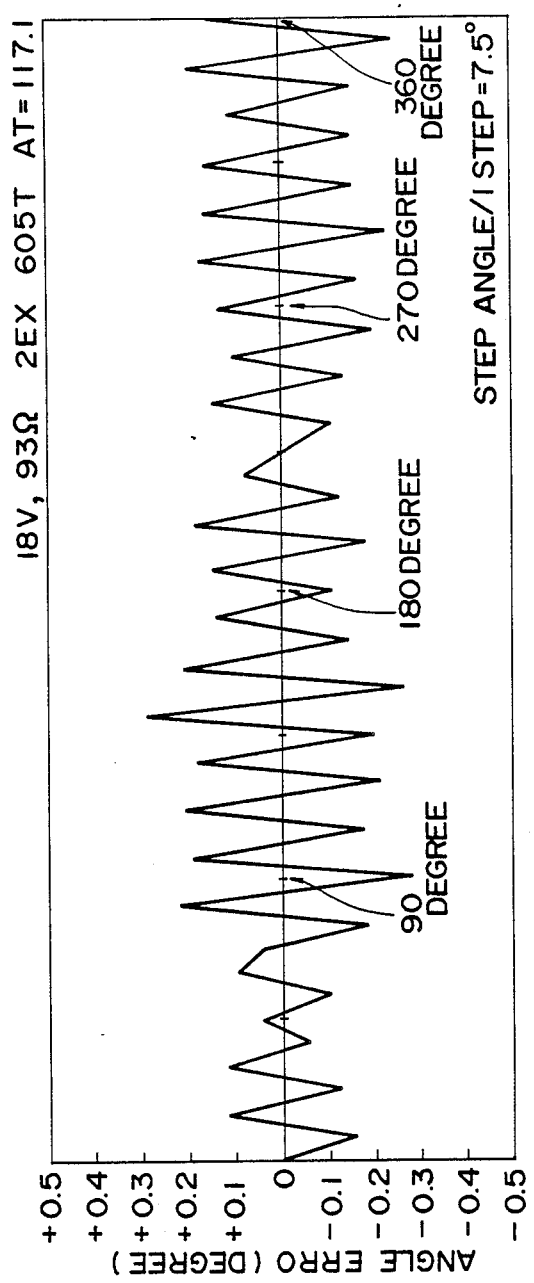
FIG. 2 is a graph of the stationary angle error of a stepping motor according to the prior art.
Figure 10:
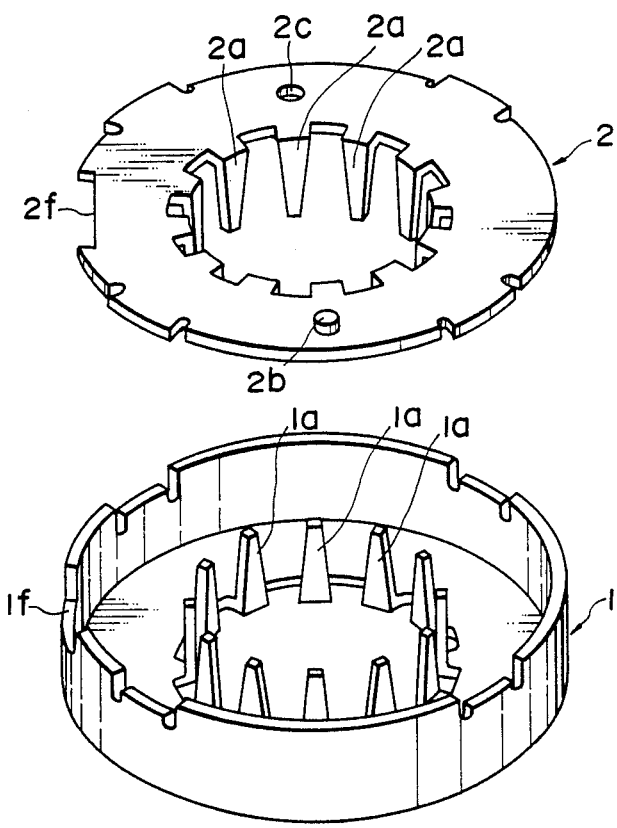
FIG. 10 is an exploded perspective view of a stator set according to the prior art.
Figure 11:
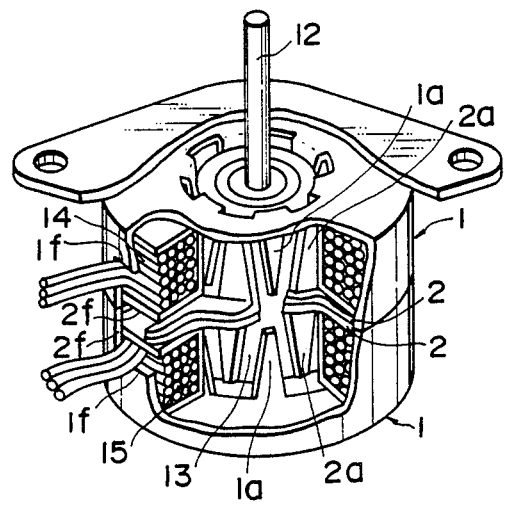
FIG. 11 is a partly broken-away perspective view of a stepping motor.
Figure 12:
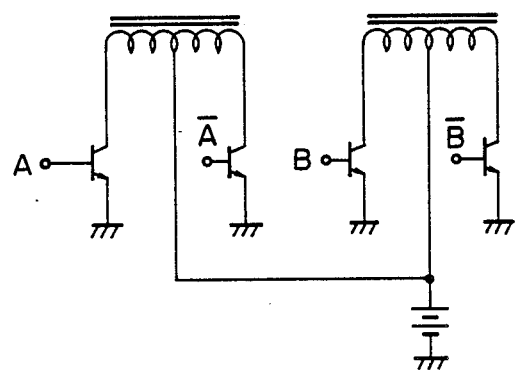
FIG. 12 is a diagram of the driving circuit of the stepping motor.
Figure 13:
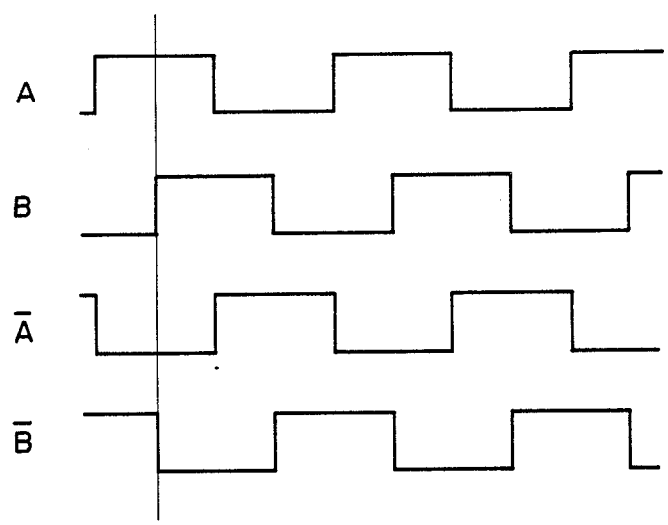
FIG. 13 is a timing chart of the driving of the motor.

FIG. 2 shows the result of an experiment of the angle error at each step of the conventional stepping motor shown in FIGS. 10 and 11. The specification of the motor is: outer diameter =42 mm, stator thickness =16.8 mm, inner diameter of stator =22.4 mm, thickness of stator pole plate =1 mm, width of the root of stator pole =2.65 mm, width of the tip end of stator pole =0.7 mm, coil resistance =93 Ω, number of turns of coil wire =605 turns, driving voltage =18 V, and ampare turn is 117.

Figure 3:
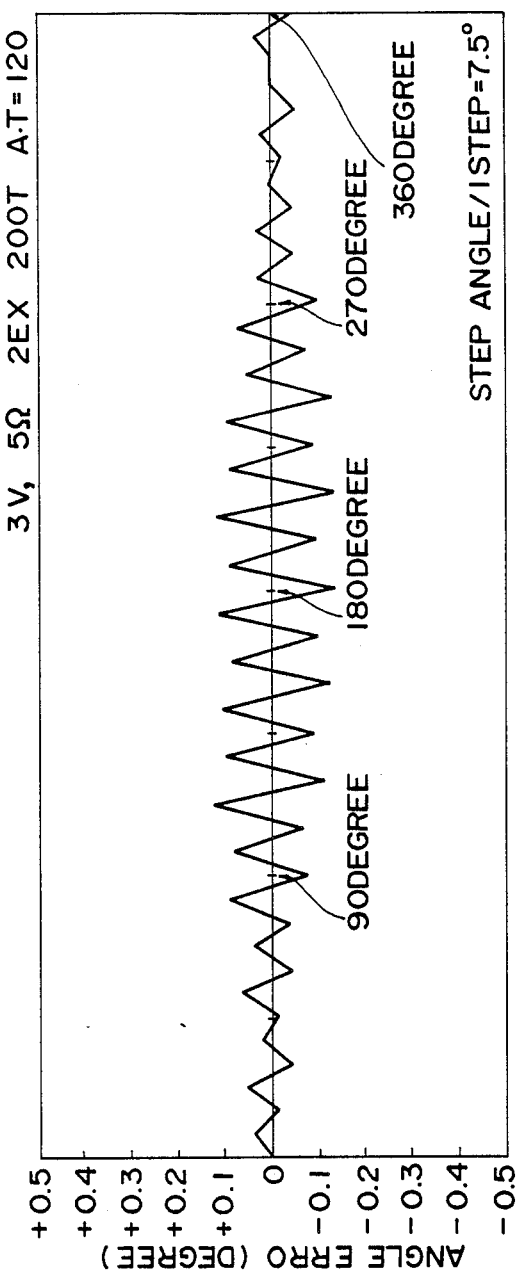
FIG. 3 is a graph of the stationary angle error of the stepping motor according to the first embodiment of the present invention.

FIG. 3 shows the experimental values of the angle error at each step when in the present embodiment shown in FIG. 1, the cogging torque is adjusted to minimum. The specification of the motor is equal to the specification of FIG. 2 except for coil resistance =5 Ω, number of turns of coil wire =200 T, driving voltage =3 V and ampare turn =120.

As is clear from FIGS. 2 and 3 in which the ampere turns are substantially equal, it can be understood that in the motor of the present invention, as compared with the prior art, the angle error at each step is greatly improved.

Figure 4:
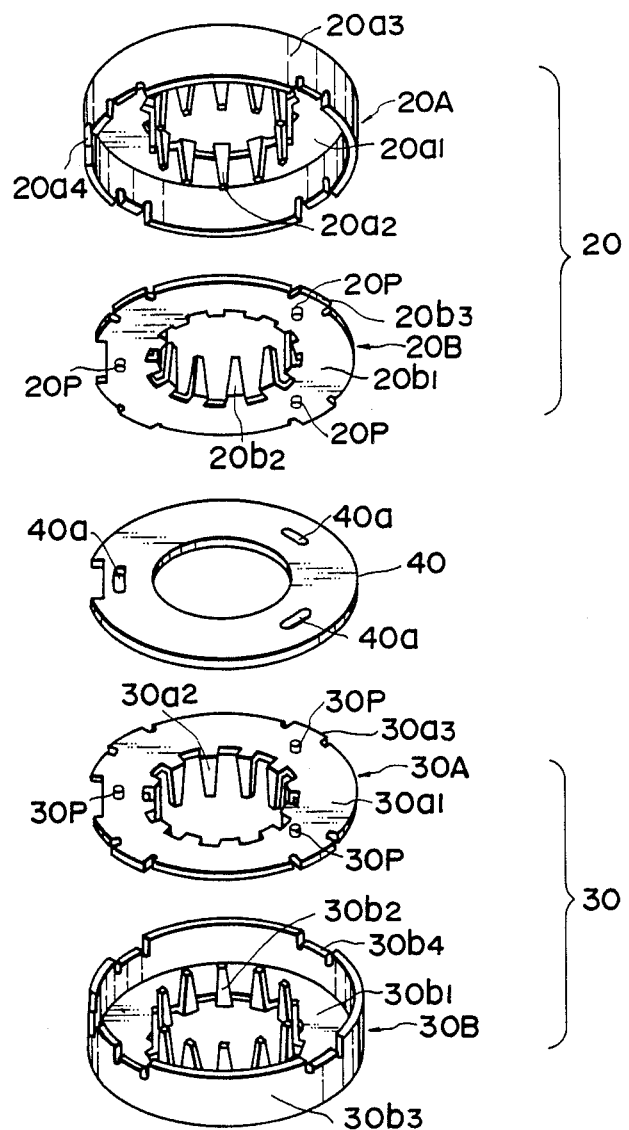
FIG. 4 is an exploded perspective view of a stator set according to a second embodiment of the present invention.

FIG. 4 shows a second embodiment to which the aforedescribed first embodiment is applied. In FIG. 4, members designated by reference characters similar to those in FIG. 1a are identical to the members in FIG. 1a in function and shape. The first stator member 20A and the fourth stator member 30B have ring plate portions $20a_1$, $30b_1$, first and fourth pole teeth $20a_2$, $30b_2$, cylinder portions $20a_3$, $30b_3$ and cut-away portions $20a_4$, $30b_4$.

The second stator member 20B and the third stator member 30A have ring plate portions $20b_1$, $30a_1$, second and third pole teeth $20b_2$, $30a_2$ and projected portions $20b_3$, $30a_3$.

Adjusting means for the stator yoke units of the present embodiment comprises an adjusting ring 40, and pins 20p and 30p provided on the second and third stator members. The adjusting ring 40 has an inner diameter and an outer diameter which are equal to those of the ring plate portions of the second and third stator members or which are of such a degree that the adjusting ring 40 does not protrude from the ring plate portions, and has a plurality of arcuate slots 40a concentrically about the axis of the shaft.

For the assembly of the motor according to the present embodiment, the coils described with respect to the first embodiment are fitted into the cylinder portions of the first and fourth stator members, and the first and second stator members are fixed to each other by welding means or the like with the projections $20b_3$ engaged with the cut-away portions $20a_4$ and with the pole teeth $20a_2$ and $20b_2$ deviated from each other by ½ pitch. Likewise, the third and fourth stator members are combined together and fixed to each other. The first stator yoke unit 20 and the second stator yoke unit 30 are individually combined together, whereafter the adjusting ring 40 is interposed between the second and the third stator member. At this time, the pins 20p and 30p are fitted into the slots 40a. The lengths of the pins 20p and 30p are shorter than the thickness of the adjusting ring 40. After such assembly, as shown in FIG. 1b, the rotor portion is fitted into the motor mounting plate, the first stator yoke unit 20 and the second stator yoke unit 30 are tentatively fixed to the adjusting ring 40, the measurement of the cogging torque described with respect to the first embodiment is effected, and the first stator yoke unit and the second stator yoke unit are rotated relative to the adjusting ring 40 to adjust the positions thereof, whereafter the second and third stator members 20B and 30A are fixed to the adjusting ring 40 by welding.

Figure 5:
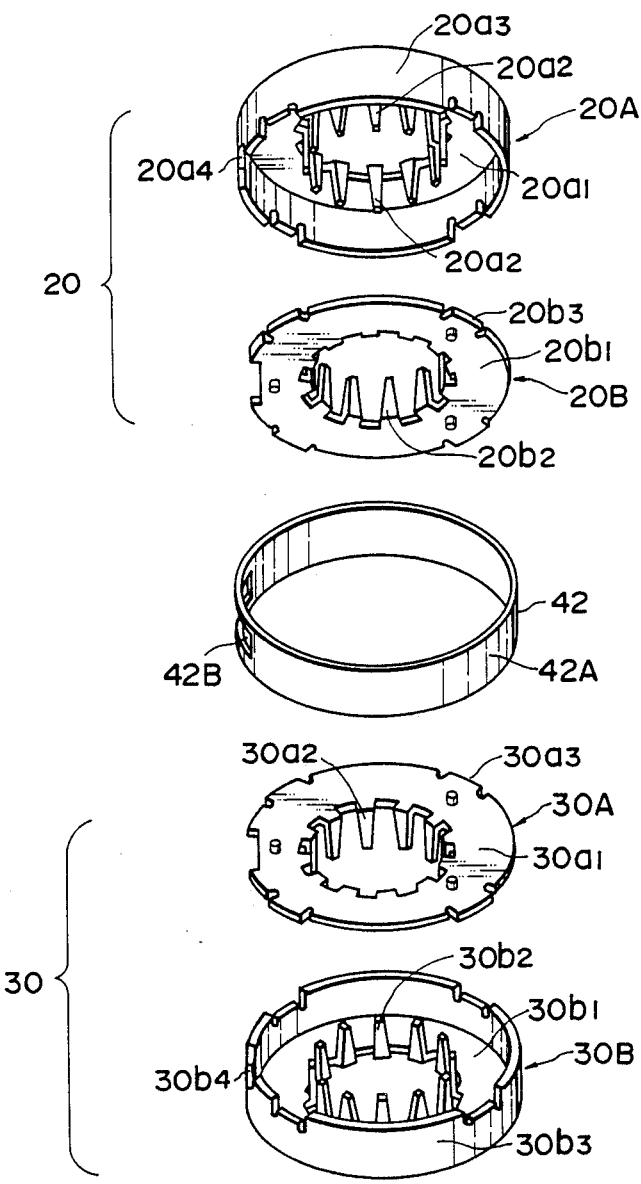
FIG. 5 an exploded perspective view of a stator set according to a third embodiment of the present invention.

FIG. 5 shows an exploded view of stator yoke units according to a third embodiment of the present invention. The construction of the embodiment shown in FIG. 5 is such that the adjusting ring 40 in the second embodiment in FIG. 4 is replaced by a phase adjusting member 42, and the shapes of the first stator member 20A, the second stator member 20B, the third stator member 30A and the fourth stator member 30B are the same as the shapes of the stator members of FIG. 4.

The phase adjusting member 42 has a ring portion 42A fitted to the outer periphery of the cylinder portions of the first and fourth stator members, and an opening 42B through which the terminal of a coil is drawn out. As described with respect to the first embodiment, the stator yoke units 20 and 30 are fixed with the relative positional relation between the pole teeth thereof kept, whereafter the stator yoke units 20 and 30 are superposed one upon the other and fitted into the phase adjusting member 42. Subsequently, the first stator member 20A is fixed to the motor mounting plate shown in FIG. 1b, a shaft having a magnet is inserted into central openings in the stator yoke units and the shaft is supported by the aforementioned bearing. By such assembly, the pole teeth of the first stator yoke unit 20 and the second stator yoke unit 30 prevent deviation in a direction parallel to the center line of the stator members and permit relative rotation about the center line.

The stator yoke units and the adjusting member are tentatively fixed and cogging torque is measured. The first stator yoke unit and the second stator yoke unit are rotated relative to each other in the adjusting member and the cogging torque is adjusted, whereafter the stator yoke units and the adjusting member are fixed by welding means.

In the case of the adjusting member in the present embodiment, the range of the relative rotation of the stator yoke units can be made large.

Figure 6:
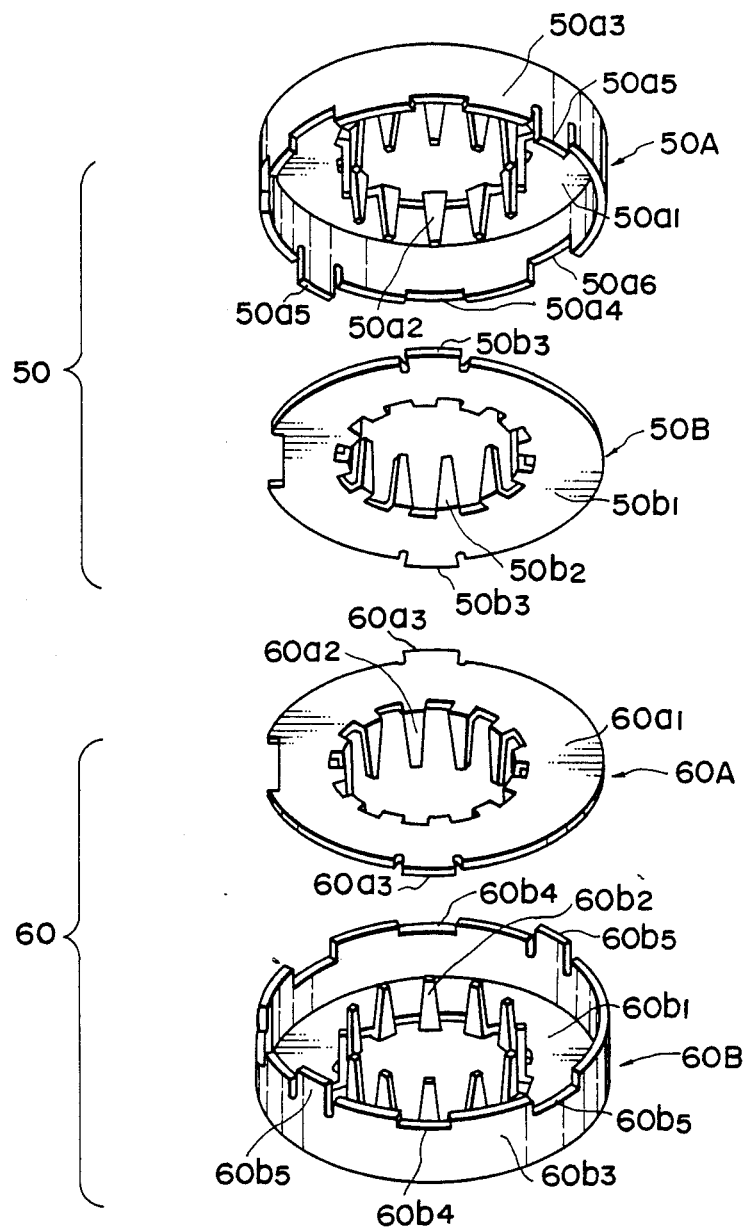
FIG. 6 is an exploded perspective view of a stator set according to a fourth embodiment of the present invention.
Figure 7:
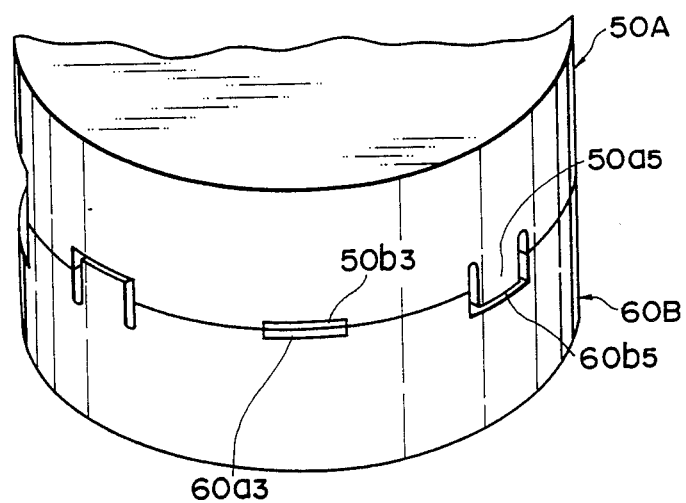
FIG. 7 is a perspective view of the essential portions of a stepping motor according to the fourth embodiment of the present invention.

FIGS. 6 and 7 show a fourth embodiment. In the figures, the reference numeral 50 designates a first stator yoke unit comprising a first stator member 50A and a second stator member 50B. The reference numeral 60 denotes a second stator yoke unit comprising a first stator member 60A and a second stator member 60B. The first stator member 50A comprises a ring plate portion $50a_1$, a plurality of first pole teeth $50a_2$ arranged on a concentric circle in the axial direction from the inner periphery of said ring plate portion, a cylinder portion $50a_3$ extending from the outer periphery of the ring plate portion, and cut-away portions $50a_4$ for holding the second stator member 50B.

The second stator member 50B comprises a ring plate portion $50b_1$, a plurality of second pole teeth $50b_2$ extending from the inside of the ring plate portion, and projected portions $50b_3$ for combining the second stator member 50B with the first stator member 50A. The projected portions $50b_3$ are engaged with the cut-away portions $50a_4$ of the first stator member 50A. The outer periphery of the second stator member 50B is designed to be fitted to the inner periphery of the cylinder portion $50a_3$ of the first member 50A.

When the first stator yoke unit 50 is constructed with the projected portions $50b_3$ of the second stator member fitted into the cut-away portions $50a_4$ of the first stator member, the first and second pole teeth are inserted between one another and disposed while deviating by ½ pitch.

The reference numeral 60 denotes a second stator yoke unit comprising a third stator member 60A and a fourth stator member 60B. The third stator member 60A is of the same shape as the second stator member 50B, and has a ring plate portion $60a_1$, a plurality of third pole teeth $60a_2$, and projected portions $60a_3$. The fourth stator member 60B is of the same shape as the first stator member 50A, and has a ring plate portion $60b_1$, a plurality of fourth pole teeth $60b_2$, a cylinder portion $60b_3$ and cut-away portions $60b_4$.

By fitting the projected portions $60a_3$ of the third stator member into the cut-away portions $60b_4$ of the fourth stator member, the third and fourth pole teeth are inserted between one another while deviating by ½ pitch and thus are arranged.

Adjusting means for the present embodiment has a structure for permitting rotation about an axis provided in the first stator member 50A and the fourth stator member 60B. That is, engagement portions $50a_5$ and cut-away portions $50a_6$ extending from the end portion of the cylinder portion $50a_3$ of the first stator member 50A in the same direction as said axis are formed in said cylinder portion $50a_3$. On the other hand, cut-away portions $60b_5$ and engagement portions $60b_6$ are formed in the end portion of the cylinder portion $60b_3$ of the fourth stator member 60B. The cut-away width of said cut-away portions is greater than the width of said engagement portions.

The stator yoke units 50 and 60 are incorporated, the stator members are fixed, the first stator member is fixed to the motor mounting plate shown in FIG. 1b, and a shaft having a magnet is inserted into the central openings in the stator yoke units.

The engagement portions $50a_5$ of the first stator member 50A are brought into engagement with the cut-away portions $60b_5$ of the fourth stator member 60B, whereby the first stator yoke unit and the second stator yoke unit overlap each other as shown in FIG. 7. In this state, the first stator yoke unit and the second stator yoke unit are permitted to rotate about the axis. Cogging torque is measured, and the stator yoke units are rotated relative to each other to thereby adjust the cogging torque, whereafter the second stator member and the third stator member are fixed by welding.

Figure 8:
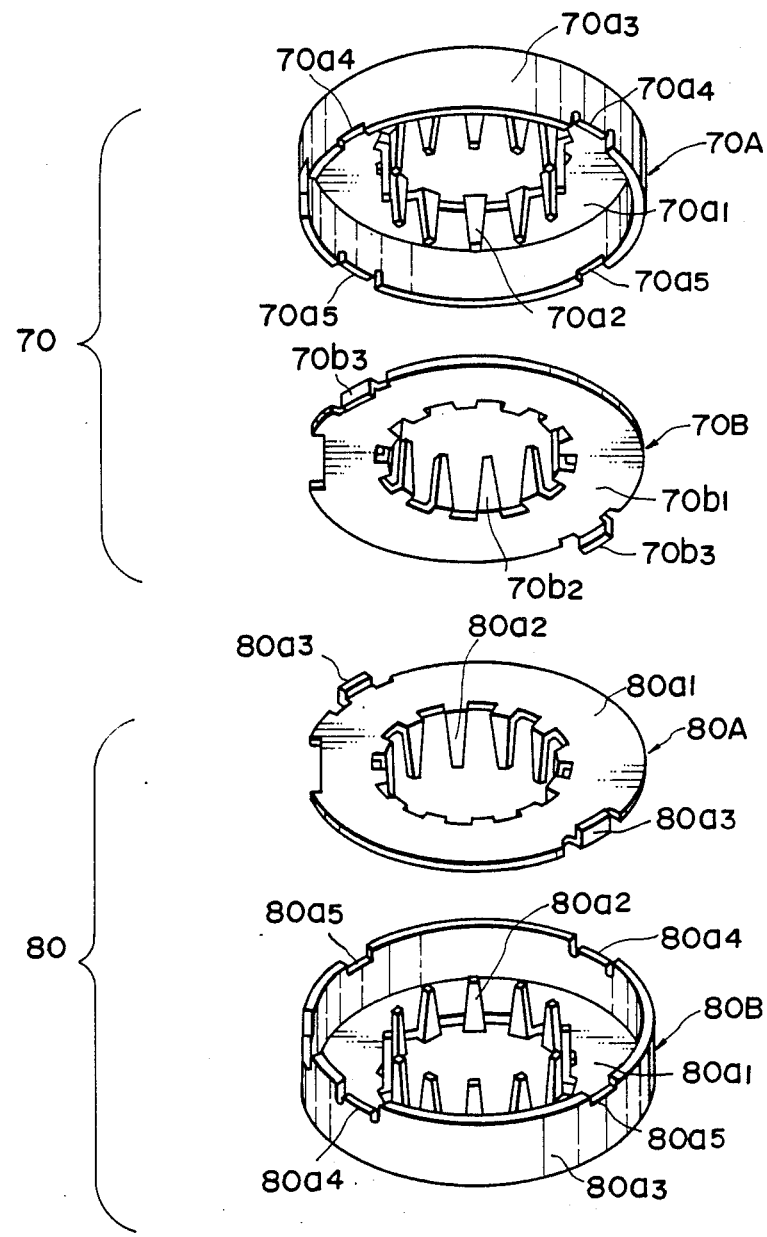
FIG. 8 is an exploded perspective view of a stator set according to a fifth embodiment of the present invention.
Figure 9:
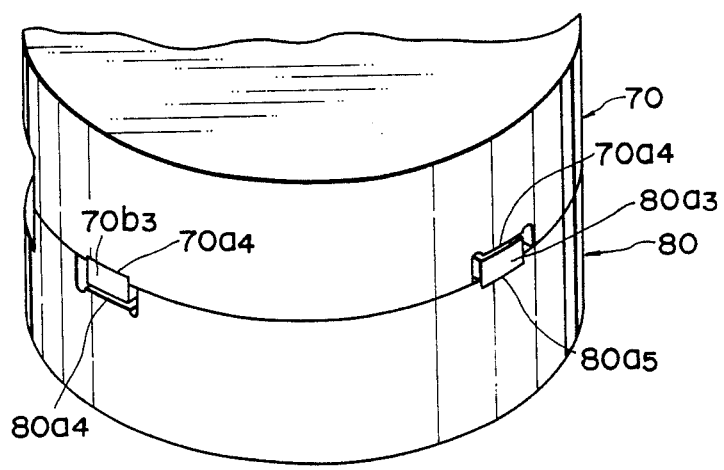
FIG. 9 is a perspective view of the essential portions of a stepping motor according to the fifth embodiment of the present invention.

FIGS. 8 and 9 show a fifth embodiment of the present invention. This embodiment is designed such that first and fourth stator members are restrained by second and third stator members, respectively.

In the figures, the reference numeral 70 designates a first stator yoke unit comprising a first stator member 70A and a second stator member 70B. The reference numeral 80 denotes a second stator yoke unit comprising a third stator member 80A and a fourth stator member 80B.

The first stator member 70A has a ring plate portion $70a_1$, a plurality of first pole teeth $70a_2$ arranged on a concentric circle along the axis from the inner periphery of the ring plate portion $70a_1$, a cylinder portion $70a_3$, a first cut-away portion $70a_4$ engageable by the projected portion of the second stator member 70B which will be described later, and second cut-away portions $70a_5$ engageable by the projected portions of the third stator member 80A which will be described later.

The second stator member 70B has a ring plate portion $70b_1$, a plurality of second pole teeth $70b_2$ extending from the inner periphery of the ring plate portion $70b_1$, and first engagement portions $70b_3$ extending from the outer periphery of the ring plate portion and having their end portions bent toward the fourth stator member which will be described later. The first engagement portions $70b_3$ of the second stator member are engaged with the second cut-away portions $70a_5$ of the first stator member 70A, and when the first and second stator members are combined together, the outer periphery of the ring plate portion $70b_1$ of the second stator member fits to the inner periphery of the cylinder portion $70a_3$ of the first stator member and the first and second pole teeth are alternately arranged while deviating from one another by ½ pitch.

The third stator member 80A is of the same shape as the second stator member, and has a ring plate portion $80a_1$, third pole teeth $80a_2$, and second engagement portions $80a_3$ extending from the outer periphery of the ring plate portion and having their ends bent toward the first stator member.

The fourth stator member 80B is of the same shape as the first stator member, and has a ring plate portion $80a_1$, fourth pole teeth $80a_2$, a cylinder portion $80a_3$, cut-away portions $80a_4$ engageable by the first engagement portions $70b_3$ of the second stator member, and cut-away portions $80a_5$ engageable by the second engagement portions $80a_3$ of the third stator member.

By the third and fourth stator members being combined together with the second engagement portions $80a_3$ of the third stator member being brought into engagement with the cut-away portions $80a_5$ of the fourth stator member, the third and fourth pole teeth are alternately arranged while deviating from one another by ½ pitch.

The first and second stator yoke units are combined together and fixed, and the first stator member is fixed to the motor mounting plate shown in FIG. 1b. Coils, not shown, are contained in said cylinder portions of the stator members, a shaft having a magnet mounted thereon is inserted into the central openings in the stator members, and the shaft is supported by the bearing of the motor mounting plate. The first stator yoke unit 70 and the second stator yoke unit 80 are superposed one upon the other, the first engagement portions $70b_3$ of the second stator member 70B are brought into engagement with the cut-away portions $80a_4$ of the fourth stator member 80B, and the second engagement portions $80a_3$ of the third stator member 80A are brought into engagement with the cut-away portions $70a_4$ of the first stator member 70A.

The cut-away portions $80a_4$ and $70a_4$ are larger than the widthwise dimensions of the engagement portions $70b_3$ and $80a_3$. Therefore, as shown in FIG. 9, the second stator member is kept fixed to the first stator member 70A with the first engagement portions $70b_3$ of the second stator member fitted in the cut-away portions $70a_5$ of the first stator member, and said first engagement portions $70b_3$ are engaged with the cut-away portions $80a_4$ of the fourth stator member 80B, but these stator members become rotatable relative to each other because the cut-away width of the cut-away portions $80a_4$ is greater than the width of the first engagement portions.

The second engagement portions $80a_3$ of the third stator member 80A, like the second stator member, are kept fixed relative to the fourth stator member, and the second engagement portions $80a_3$ are engaged with the cut-away portions $70a_4$ of the first stator member 70A, and the first stator yoke unit is rotatable about the axis relative to the third stator member because the cut-away width of the cut-away portions $70a_4$ is greater than the widthwise dimension of the second engagement portions $80a_3$.

The first stator yoke unit and the second stator yoke unit are tentatively fixed, cogging torque is measured, the stator yoke units are rotated relative to each other to thereby adjust the cogging torque, and the third stator member and the fourth stator member are welded to each other and fixed. In the present embodiment, the second stator member and the third stator member are kept fixed to the first and fourth stator members, respectively, by said engagement portions, and the second stator member 70B is rotatably engaged with the second stator yoke unit 80 and the third stator member 80A is rotatably engaged with the first stator yoke unit 70. Therefore, the fixed coupling of the stator yoke units and the relative rotation between the stator yoke units become possible by the engagement portions.

As described above, according to the present invention, the phase deviation between the stator yoke units can be set as desired and the cogging torque can be controlled and therefore, there can be constructed a motor in which the cogging torque is small and which is high in step angle accuracy and excellent in control performance and also, there can be constructed a motor in which the retained torque is great even when the cogging torque is made great and the motor is brought into non-energized condition and thus, even the same motor can demonstrate its optimum characteristic in conformity with the purpose of use.

We claim:

1. A stepping motor comprising:
   a rotor having a shaft and a magnet;
   a first stator yoke unit having:
      a first stator member having a plurality of first teeth arranged in the same direction as the axis of said shaft and about said axis, a first ring plate supporting said first pole teeth, and a first cylinder portion extending from the outer periphery of said first ring plate, and
      a second stator member having a plurality of second pole teeth disposed between said first pole teeth, and a second ring plate supporting said second pole teeth, said second stator member forming a pair with said first stator member;
   a first engaging member for engaging said first stator member and said second stator member, said engaging member permitting shifting of the distance between pole teeth of said first and second stator members by substantially one half pitch;
   a second stator yoke unit having;
      a third stator member having a plurality of said pole teeth arranged in the same direction as said axis and about said axis, and a third ring plate supporting said third pole teeth, and
      a fourth stator member having a plurality of fourth pole teeth disposed between said third pole teeth, a fourth ring plate supporting said fourth pole teeth, and a second cylinder portion extending from the outer periphery of said fourth ring plate, said fourth stator member forming a pair with said third stator member;
   a second engaging member for engaging said third stator member and said fourth stator member, said engaging member permitting shifting of the distance between pole teeth of said first and second stator members by substantially one half pitch;
   a coil for exciting said first to fourth pole teeth; and
   an adjusting means for adjusting the positions of said first stator yoke unit and said second stator yoke unit, said adjusting means being constructed to permit relative rotation of said first and second stator yoke units about said axis so that cogging torque produced by said motor becomes a predetermined amount by relatively rotating said first and second ring plates while maintaining them coaxial to said shaft.

2. A stepping motor according to claim 1, wherein said adjusting means disposes said second ring plate and said third ring plate back to back, as slit-like recess is formed in one of said ring plates and a pin engageable with said slit-like recess is provided on the other ring plate.

* * * * *

UNITED STATES PATENT AND TRADEMARK OFFICE
CERTIFICATE OF CORRECTION

PATENT NO. : 4,972,109

DATED : November 20, 1990

INVENTOR(S) : Masaaki Kakizaki et al.

It is certified that error appears in the above-identified patent and that said Letters Patent is hereby corrected as shown below:

FIGURE 2):

"ERRO" should read --ERROR--.

FIGURE 3:

"ERRO" should read --ERROR--.

Figure 14C:
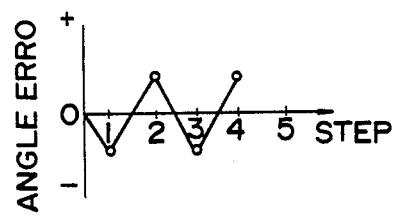
FIG. 14c illustrates the angle error of the rotor.
Figure 15:
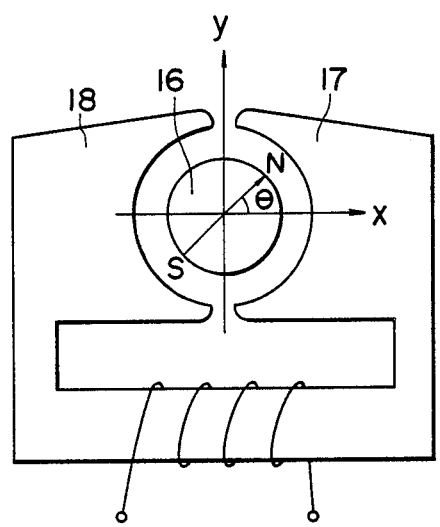
FIG. 15 illustrates a two-pole stepping motor according to the prior art.
Figure 16:
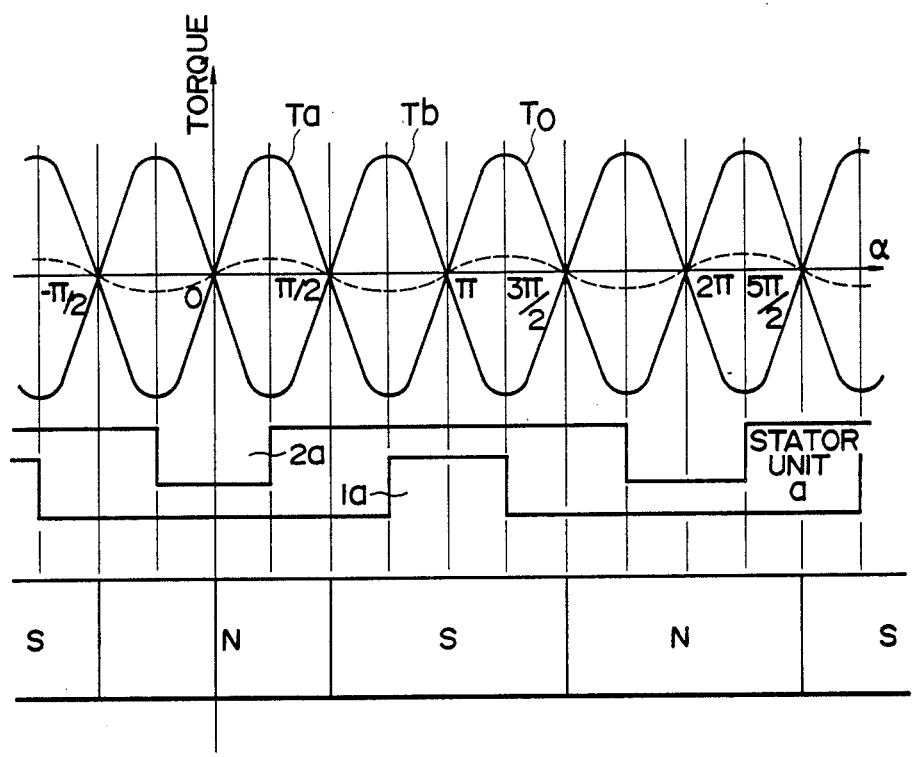
Figure 17:
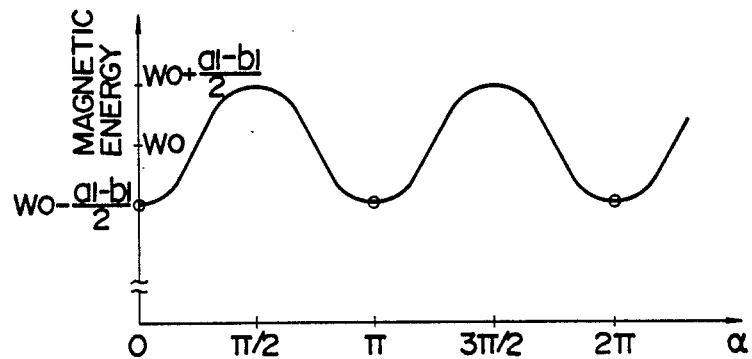
FIG. 17 illustrates the standstill of the rotor.

FIGURE 14c:

"ERRO" should read --ERROR--.

COLUMN 1:

Line 16, "stators and 2" should read --stators 1 and 2--.

Line 68, "therefore," should read --therefore, the torque is zero at rotor rotational positions ($\theta$) of--.

COLUMN 2:

Line 4, "$\theta = \frac{\pi}{2} , \frac{3\pi}{2}$" should read

-- $\theta = \frac{\pi}{2} . \frac{3\pi}{2}$ --.

UNITED STATES PATENT AND TRADEMARK OFFICE
CERTIFICATE OF CORRECTION

PATENT NO. : 4,972,109

DATED : November 20, 1990

INVENTOR(S) : Masaaki Kakizaki et al.

It is certified that error appears in the above-identified patent and that said Letters Patent is hereby corrected as shown below:

COLUMN 3:

Line 46, "drawings" should read --drawings.--.

Line 53, "is" should read --if--.

COLUMN 7:

Line 60, "cylinder portions 20a and $30a_3$" should read --cylinder portions $20a_3$ and $30a_3$--.

Line 67, "reference numeral 35" should read --reference numeral 36--.

Line 68, "magnet 35" should read --magnet 36--.

COLUMN 9:

Line 2, "ampare turn" should read --ampere turn--; and numeral "117" should not be printed in bold.

Line 9, "ampare turn" should read --ampere turn--.

UNITED STATES PATENT AND TRADEMARK OFFICE
CERTIFICATE OF CORRECTION

PATENT NO. : 4,972,109

DATED : November 20, 1990

INVENTOR(S) : Masaaki Kakizaki et al.

It is certified that error appears in the above-identified patent and that said Letters Patent is hereby corrected as shown below:

COLUMN 13:

Line 34, "teeth" should read --pole teeth--.

COLUMN 14:

Line 8, "having;" should read --having:--.

Line 23, "first and second" should read --third and fourth--.

Line 37, "as" should read --a--.

Signed and Sealed this

Twenty-fifth Day of August, 1992

*Attest:*

DOUGLAS B. COMER

*Attesting Officer*     *Acting Commissioner of Patents and Trademarks*